US011093522B2

(12) United States Patent
Wang et al.

(10) Patent No.: US 11,093,522 B2
(45) Date of Patent: Aug. 17, 2021

(54) DATABASE REPLICATION METHOD AND APPARATUS FOR DISTRIBUTED SYSTEM

(71) Applicant: Huawei Technologies Co., Ltd., Guangdong (CN)

(72) Inventors: Guoping Wang, Shenzhen (CN); Junhua Zhu, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 488 days.

(21) Appl. No.: 16/165,596

(22) Filed: Oct. 19, 2018

(65) Prior Publication Data
US 2019/0057142 A1    Feb. 21, 2019

Related U.S. Application Data

(63) Continuation of application No. PCT/CN2016/080068, filed on Apr. 22, 2016.

(51) Int. Cl.
*G06F 16/00* (2019.01)
*G06F 16/27* (2019.01)
(Continued)

(52) U.S. Cl.
CPC .............. *G06F 16/27* (2019.01); *G06F 16/00* (2019.01); *G06F 16/1873* (2019.01);
(Continued)

(58) Field of Classification Search
CPC .. G06F 16/00; G06F 16/1873; G06F 16/2379; G06F 16/27; G06F 16/273; G06F 16/278
See application file for complete search history.

(56) References Cited

U.S. PATENT DOCUMENTS 8,650,155 B2    2/2014  Corbin et al.
10,353,907 B1 *  7/2019  Gupta ................... G06F 16/951
(Continued)

FOREIGN PATENT DOCUMENTS

CN    1984448 A    6/2007
CN    101470629 A   7/2009
(Continued)

OTHER PUBLICATIONS

Fan, Hua. "High performance multi-partition transaction." Proceedings of the VLDB 2015 PhD Workshop co-located with the 41rd International Conference on Very Large Databases (VLDB 2015), Hawaii, USA. 2015. (Year: 2015).*
(Continued)

*Primary Examiner* — Diedra McQuitery
(74) *Attorney, Agent, or Firm* — Womble Bond Dickinson (US) LLP

(57) ABSTRACT

A database replication method and apparatus for a distributed system are provided and relate to the database field. The method includes: receiving by a coordination server, a timestamp of a multi-partition transaction newly added to a first partition of a secondary cluster; determining, by the coordination server, a target timestamp for the first partition based on the received timestamp of the newly added multi-partition transaction and a stored multi-partition transaction timestamp of each partition of the secondary cluster; and sending, by the coordination server, the target timestamp to the first partition, so that the first partition executes a replication log in the first partition based on the target timestamp. In this way, the corresponding partition can execute, without waiting, a multi-partition transaction that is present in all the partitions but has not been executed, thereby avoiding data inconsistency and increasing replication efficiency.

15 Claims, 7 Drawing Sheets

(51) Int. Cl.
  *G06F 16/18*    (2019.01)
  *G06F 16/23*    (2019.01)
(52) U.S. Cl.
  CPC ........ *G06F 16/2379* (2019.01); *G06F 16/273* (2019.01); *G06F 16/278* (2019.01)

(56) References Cited

U.S. PATENT DOCUMENTS

| | | |
|---|---|---|
| 2009/0172317 A1 | 7/2009 | Saha et al. |
| 2009/0217274 A1 | 8/2009 | Corbin et al. |
| 2011/0251997 A1 | 10/2011 | Wang et al. |
| 2013/0290249 A1 | 10/2013 | Merriman et al. |
| 2016/0070589 A1* | 3/2016 | Vermeulen .............. G06F 9/466 711/153 |
| 2019/0171763 A1* | 6/2019 | Cai ....................... G06F 16/951 |
| 2019/0392047 A1* | 12/2019 | Sorenson, III ...... G06F 16/2255 |
| 2019/0392061 A1* | 12/2019 | Terry ................. G06F 16/2308 |

FOREIGN PATENT DOCUMENTS

| | | |
|---|---|---|
| CN | 102037463 A | 4/2011 |
| CN | 102110121 A | 6/2011 |
| CN | 103810060 A | 5/2014 |
| CN | 104573100 A | 4/2015 |
| WO | 2016/040666 A1 | 3/2016 |

OTHER PUBLICATIONS

Pavlo, Andrew. On scalable transaction execution in partitioned main memory database management systems. Diss. PhD thesis, Brown University, 2014. (Year: 2014).*

* cited by examiner

DATABASE REPLICATION METHOD AND APPARATUS FOR DISTRIBUTED SYSTEM

CROSS-REFERENCE TO RELATED APPLICATIONS

This application is a continuation of International Application No. PCT/CN2016/080068 filed on Apr. 22, 2016, the disclosure of which is hereby incorporated by reference in its entirety.

TECHNICAL FIELD

The present disclosure relates to the database field, and in particular, to a database replication method and apparatus for a distributed system.

BACKGROUND

In a distributed system, database replication means replication of a database of a primary cluster to a secondary cluster. When the primary cluster goes down due to a disaster, data service is provided by the secondary cluster, so as to implement remote disaster recovery.

Generally, a common distributed system architecture is a logically unified system architecture in which a plurality of physically dispersed nodes are connected by a computer network, and the node may be specifically an ordinary computer, mobile terminal, workstation, general-purpose server, dedicated server, or the like, or may be a virtual node, that is, a virtual machine. Data of a distributed system is allocated to a plurality of partitions. Each partition saves a part of the data, and a collection of data in all partitions constitutes the complete data. Each node may include one or more partitions. The distributed system includes a primary cluster and a secondary cluster. Both the primary cluster and the secondary cluster include a plurality of nodes, and each node includes one or more partitions. Partitions of the primary cluster are in one-to-one correspondence with those of the secondary cluster, and each partition of the primary cluster and the secondary cluster has a log buffer to store a replication log used to record transactions included in the current partition. The replication log records a plurality of log records, and each log record is used to record one transaction. In the distributed system, transactions are categorized into single-partition transactions and multi-partition transactions. The single-partition transaction is a transaction running only in one partition, and the multi-partition transaction is a transaction running in all partitions.

Database replication is implemented between the primary cluster and the secondary cluster by using the replication logs. A commonly used method for existing database replication includes: when a buffer of a partition of the primary cluster is full or comes to a given period, the primary cluster sends a replication log of the partition to a corresponding partition of the secondary cluster, and the corresponding partition of the secondary cluster executes all log records in the replication log to implement database replication. In this method, for a multi-partition transaction, a replication log of the multi-partition transaction is saved in each partition of the primary cluster. However, because buffers of the partitions are in different statuses or in different periods, it may occur that some partitions of the primary cluster have sent the replication log of the multi-partition transaction to corresponding partitions of the secondary cluster, while some other partitions have not sent the replication log of the multi-partition transaction. Consequently, some partitions of the secondary cluster have executed a replication log of a multi-partition transaction, while some other partitions of the secondary cluster have not executed the replication log of this multi-partition transaction, so that data is not consistent in all partitions.

SUMMARY

Embodiments of the present disclosure provide a database replication method and apparatus for a distributed system, to resolve a prior-art problem that data is not consistent in all partitions of a secondary cluster. The technical solutions are as follows:

According to a first aspect, a database replication method for a distributed system is provided, where the distributed system includes a primary cluster and a secondary cluster, both the primary cluster and the secondary cluster include a plurality of database partitions, the plurality of partitions of the primary cluster are in one-to-one correspondence with the plurality of partitions of the secondary cluster, each partition of the primary cluster sends a replication log of the partition to a corresponding partition of the secondary cluster, the replication log records data operation transactions, and the method includes: sending, by a first partition of the secondary cluster to a coordination server, a timestamp of a multi-partition transaction newly added to the first partition, where the newly added multi-partition transaction is a multi-partition transaction among transactions recorded in a replication log that is sent by a corresponding partition of the primary cluster and received by the first partition since the first partition last sends a multi-partition transaction timestamp to the coordination server; determining, by the coordination server, a target timestamp for the first partition based on the received timestamp of the newly added multi-partition transaction and a multi-partition transaction timestamp, of each partition of the secondary cluster, stored on the coordination server, where the target timestamp is used to indicate information about a multi-partition transaction executable by the first partition; sending, by the coordination server, the target timestamp to the first partition; and executing, by the first partition, a replication log in the first partition based on the target timestamp.

With reference to the first aspect, in a first possible implementation of the first aspect, the determining, by the coordination server, a target timestamp for the first partition based on the received timestamp of the newly added multi-partition transaction and a multi-partition transaction timestamp, of each partition of the secondary cluster, stored on the coordination server includes:

determining whether the multi-partition transaction timestamps of the partitions of the secondary cluster all coincide; and if the multi-partition transaction timestamps of the partitions of the secondary cluster do not all coincide, determining an intersection of the multi-partition transaction timestamps of the partitions of the secondary cluster, and obtaining, from a multi-partition transaction timestamp, that is outside the intersection, of the partitions of the secondary cluster, a timestamp with a smallest value as the target timestamp for the first partition; or if the multi-partition transaction timestamps of the partitions of the secondary cluster all coincide, using a first designated timestamp as the target timestamp for the first partition, where the first designated timestamp is used to instruct the first partition to execute log records in the replication log in the partition until a log record of a next newly added multi-partition transaction is encountered. Based on the maintained timestamp of a multi-partition transaction included in each partition, the coordination server can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, thereby avoiding data inconsistency between the partitions of the secondary cluster.

With reference to the first possible implementation of the first aspect, in a second possible implementation of the first aspect, the executing, by the first partition, a replication log in the first partition based on the target timestamp includes:

if the target timestamp for the first partition is the timestamp with the smallest value among the multi-partition transaction timestamp that is outside the intersection, executing a log record, in the replication log in the first partition, that is preceding a multi-partition transaction corresponding to the target timestamp; or if the target timestamp is the first designated timestamp, executing log records in the replication log in the first partition until a log record of a next newly added multi-partition transaction is encountered. That the first partition executes log records in the partition based on the target timestamp ensures data consistency between the first partition and another partition of the secondary cluster.

With reference to the first aspect, in a third possible implementation of the first aspect, the determining, by the coordination server, a target timestamp for the first partition based on the received timestamp of the newly added multi-partition transaction and a multi-partition transaction timestamp, of each partition of the secondary cluster, stored on the coordination server includes:

determining an intersection of the multi-partition transaction timestamps of the partitions of the secondary cluster and determining whether the intersection is an empty set; and if the intersection is not an empty set, obtaining a timestamp with a largest value from the intersection as the target timestamp for the first partition; or if the intersection is an empty set, using a second designated timestamp as the target timestamp for the first partition, where the second designated timestamp is used to instruct the first partition to sequentially execute log records in the replication log in the partition until a multi-partition transaction log record is encountered. Based on the maintained timestamp of a multi-partition transaction included in each partition, the coordination server can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

With reference to the third possible implementation of the first aspect, in a fourth possible implementation of the first aspect, the executing, by the first partition, a replication log in the first partition based on the target timestamp includes:

if the target timestamp for the first partition is the timestamp with the largest value in the intersection, executing a log record, in the first partition, that is preceding a multi-partition transaction corresponding to a $1^{st}$ multi-partition transaction timestamp following the target timestamp; or if the target timestamp for the first partition is the second designated timestamp, sequentially executing log records in the first partition until a multi-partition transaction log record is encountered. That the first partition executes log records in the partition based on the target timestamp ensures data consistency between the first partition and another partition of the secondary cluster.

With reference to the first aspect, in a fifth possible implementation of the first aspect, the coordination server is an independent device of the secondary cluster, or is disposed on all nodes of the secondary cluster. Flexibility of implementing the database replication method is improved by providing a plurality of implementations of the coordination server.

With reference to the first aspect, in a sixth possible implementation of the first aspect, the sending, by a first partition of the secondary cluster to a coordination server, a timestamp of a multi-partition transaction newly added to the first partition includes:

sending, to the coordination server when the first partition meets a trigger condition, the timestamp of the multi-partition transaction newly added to the first partition, where the trigger condition is that a log buffer of the first partition is full, or that the first partition comes to a preset period, or that the first partition is in an idle state.

According to a second aspect, a distributed system is provided, where the system includes a primary cluster and a secondary cluster, both the primary cluster and the secondary cluster include a plurality of database partitions, the plurality of partitions of the primary cluster are in one-to-one correspondence with the plurality of partitions of the secondary cluster, each partition of the primary cluster sends a replication log of the partition to a corresponding partition of the secondary cluster, the replication log records data operation transactions, and the secondary cluster further includes a coordination server, where a first partition of the secondary cluster sends, to the coordination server, a timestamp of a multi-partition transaction newly added to the first partition, where the newly added multi-partition transaction is a multi-partition transaction among transactions recorded in a replication log that is sent by a corresponding partition of the primary cluster and received by the first partition since the first partition last sends a multi-partition transaction timestamp to the coordination server; the coordination server is configured to determine a target timestamp for the first partition based on the received timestamp of the newly added multi-partition transaction and a multi-partition transaction timestamp, of each partition of the secondary cluster, stored on the coordination server, where the target timestamp is used to indicate information about a multi-partition transaction executable by the first partition; the coordination server is further configured to send the target timestamp to the first partition; and the first partition is further configured to execute a replication log in the first partition based on the target timestamp.

According to a third aspect, a database replication method for a distributed system is provided, where the method includes:

receiving a timestamp of a multi-partition transaction newly added to a first partition of a secondary cluster, where the newly added multi-partition transaction is a multi-partition transaction among transactions recorded in a replication log that is sent by a corresponding partition of a primary cluster and received by the first partition since the first partition last sends a multi-partition transaction timestamp; determining a target timestamp for the first partition based on the received timestamp of the newly added multi-partition transaction and a stored multi-partition transaction timestamp of each partition of the secondary cluster, where the target timestamp is used to indicate information about a multi-partition transaction executable by the first partition; and sending the target timestamp to the first partition, so that the first partition executes a replication log in the first partition based on the target timestamp.

With reference to the third aspect, in a first possible implementation of the third aspect, the determining a target timestamp for the first partition based on the received timestamp of the newly added multi-partition transaction and a stored multi-partition transaction timestamp of each partition of the secondary cluster includes:

determining whether the multi-partition transaction timestamps of the partitions of the secondary cluster all coincide; and if the multi-partition transaction timestamps of the partitions of the secondary cluster do not all coincide, determining an intersection of the multi-partition transaction timestamps of the partitions of the secondary cluster, and obtaining, from a multi-partition transaction timestamp, that is outside the intersection, of the partitions of the secondary cluster, a timestamp with a smallest value as the target timestamp for the first partition, where the timestamp with the smallest value is used to instruct the first partition to execute a log record, in the replication log in the first partition, that is preceding a multi-partition transaction corresponding to the target timestamp; or if the multi-partition transaction timestamps of the partitions all coincide, using a first designated timestamp as the target timestamp for the first partition, where the first designated timestamp is used to instruct the first partition to execute log records in the replication log in the partition until a log record of a next newly added multi-partition transaction is encountered. Based on the maintained timestamp of a multi-partition transaction included in each partition, the coordination server can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

With reference to the third aspect, in a second possible implementation of the third aspect, the determining a target timestamp for the first partition based on the received timestamp of the newly added multi-partition transaction and a stored multi-partition transaction timestamp of each partition of the secondary cluster includes: determining an intersection of the multi-partition transaction timestamps of the partitions of the secondary cluster and determining whether the intersection is an empty set; and if the intersection is not an empty set, obtaining a timestamp with a largest value from the intersection as the target timestamp for the first partition, where the timestamp with the largest value is used to instruct the first partition to execute a log record, in the first partition, that is preceding a multi-partition transaction corresponding to a $1^{st}$ multi-partition transaction timestamp following the target timestamp; or if the intersection is an empty set, using a second designated timestamp as the target timestamp for the first partition, where the second designated timestamp is used to instruct the first partition to sequentially execute log records in the replication log in the partition until a multi-partition transaction log record is encountered. The target timestamp is sent to the first partition, so that the first partition can execute log records in the partition based on the target timestamp. This ensures data consistency between the first partition and another partition of the secondary cluster.

According to a fourth aspect, a database replication method for a distributed system is provided, where the method includes:

sending, to a coordination server, a timestamp of a multi-partition transaction newly added to a first partition, so that the coordination server determines a target timestamp for the first partition based on the received timestamp of the newly added multi-partition transaction and a stored multi-partition transaction timestamp of each partition of the secondary cluster, and sends the target timestamp for the first partition to the first partition, where the target timestamp is used to indicate information about a multi-partition transaction executable by the first partition; and executing a replication log in the first partition based on the target timestamp for the first partition.

With reference to the fourth aspect, in a first possible implementation of the fourth aspect, the executing a replication log in the first partition based on the target timestamp for the first partition includes:

if the target timestamp for the first partition is a timestamp with a smallest value among a multi-partition transaction timestamp that is outside an intersection of the multi-partition transaction timestamps of the partitions of the secondary cluster, executing a log record, in the replication log in the first partition, that is preceding a multi-partition transaction corresponding to the target timestamp; or if the target timestamp is the first designated timestamp, executing log records in the replication log in the first partition until a log record of a next newly added multi-partition transaction is encountered, where the first designated timestamp indicates that the multi-partition transaction timestamps of the partitions of the secondary cluster all coincide. Log record execution based on the target timestamp for the first partition can ensure that an executed multi-partition transaction is present in all the partitions. In this way, the first partition does not have to enter a waiting state whenever a multi-partition transaction is encountered, thereby avoiding data inconsistency between the first partition and another partition of the secondary cluster.

With reference to the fourth aspect, in a second possible implementation of the fourth aspect, the executing a replication log in the first partition based on the target timestamp for the first partition includes:

if the target timestamp for the first partition is a timestamp with a largest value in an intersection of the multi-partition transaction timestamps of the partitions of the secondary cluster, executing a log record, in the first partition, that is preceding a multi-partition transaction corresponding to a $1^{st}$ multi-partition transaction timestamp following the target timestamp; or if the target timestamp for the first partition is the second designated timestamp, sequentially executing log records in the first partition until a multi-partition transaction log record is encountered, where the second designated timestamp indicates that an intersection of the multi-partition transaction timestamps of the partitions of the secondary cluster is an empty set. Log record execution based on the target timestamp for the first partition can ensure that an executed multi-partition transaction is present in all the partitions. In this way, the first partition does not have to enter a waiting state whenever a multi-partition transaction is encountered, thereby avoiding data inconsistency between the first partition and another partition of the secondary cluster.

According to a fifth aspect, a database replication apparatus for a distributed system is provided, where the apparatus includes a plurality of functional modules configured to perform the method according to the third aspect. In a possible implementation, the apparatus further includes other functional modules configured to perform the method according to the plurality of possible implementations of the third aspect. Based on a maintained timestamp of a multi-partition transaction included in each partition, a coordination server can determine which multi-partition transactions are already present in all partitions and which multi-partition transactions are not present in all the partitions, and inform, by using a target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of a secondary cluster. That a first partition executes log records in the partition based on a target timestamp ensures data consistency between the first partition and another partition.

According to a sixth aspect, a database replication apparatus for a distributed system is provided, where the apparatus includes a plurality of functional modules configured to perform the method according to the fourth aspect. In a possible implementation, the apparatus further includes other functional modules configured to perform the method according to the plurality of possible implementations of the fourth aspect. Based on a maintained timestamp of a multi-partition transaction included in each partition, a coordination server can determine which multi-partition transactions are already present in all partitions and which multi-partition transactions are not present in all the partitions, and inform, by using a target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of a secondary cluster. That a first partition executes log records in the partition based on a target timestamp ensures data consistency between the first partition and another partition.

According to a seventh aspect, a coordination server is provided, including a memory and a processor, where the memory is configured to store a processor-executable instruction, and the processor is configured to perform the method according to the third aspect. In a possible implementation, the processor is further configured to perform the method according to the plurality of possible implementations of the third aspect. Based on a maintained timestamp of a multi-partition transaction included in each partition, the coordination server can determine which multi-partition transactions are already present in all partitions and which multi-partition transactions are not present in all the partitions, and inform, by using a target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of a secondary cluster. That a first partition executes log records in the partition based on a target timestamp ensures data consistency between the first partition and another partition.

According to an eighth aspect, a database replication apparatus for a distributed system is provided, including a memory and a processor, where the memory is configured to store a processor-executable instruction, and the processor is configured to perform the method according to the fourth aspect. In a possible implementation, the processor is further configured to perform the method according to the plurality of possible implementations of the fourth aspect. Based on a maintained timestamp of a multi-partition transaction included in each partition, a coordination server can determine which multi-partition transactions are already present in all partitions and which multi-partition transactions are not present in all the partitions, and inform, by using a target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of a secondary cluster. That a first partition executes log records in the partition based on a target timestamp ensures data consistency between the first partition and another partition.

Beneficial effects of the technical solutions provided in the embodiments of the present disclosure are as follows:

Each partition of the secondary cluster sends timestamps of all multi-partition transactions included in the partition to the coordination server, so that the coordination server can determine, based on statuses of the multi-partition transactions included in each partition, which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, thereby avoiding data inconsistency between the partitions of the secondary cluster.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art can still derive other drawings from these accompanying drawings without creative efforts.

DETAILED DESCRIPTION

To make the objectives, technical solutions, and advantages of the present disclosure clearer, the following further describes the implementations of the present disclosure in detail with reference to the accompanying drawings.

Figure 1:
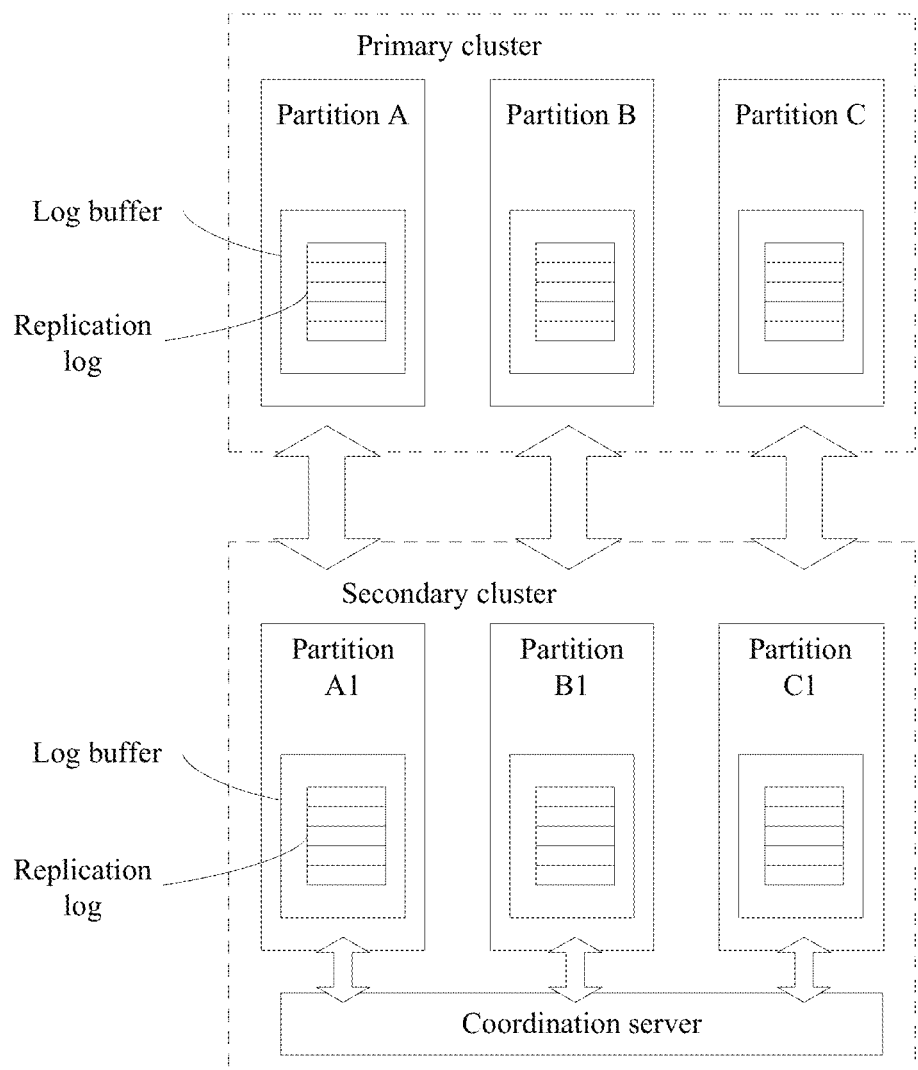
FIG. 1 is an architecture diagram of a distributed system according to an embodiment of the present disclosure.

FIG. 1 is an architecture diagram of a distributed system according to an embodiment of the present disclosure. Referring to FIG. 1, the distributed system includes a primary cluster and a secondary cluster, both the primary cluster and the secondary cluster include a plurality of partitions, and the plurality of partitions of the primary cluster are in one-to-one correspondence with the plurality of partitions of the secondary cluster.

As shown in FIG. 1, both the primary cluster and the secondary cluster include three nodes, and each node includes, for example, one partition. Three partitions of the primary cluster are a partition A, a partition B, and a partition C, respectively, and corresponding partitions of the secondary cluster are a partition A1, a partition B1, and a partition C1, respectively. In FIG. 1, only an example in which both the primary cluster and the secondary cluster include three partitions is used for illustration. No specific limitation is set on a quantity of partitions of the primary cluster or the secondary cluster in the embodiments of the present disclosure.

Each partition of the primary cluster maintains a replication log. In other words, each partition of the primary cluster has a log buffer to save a replication log used to record transactions included in the current partition. A replication log of each partition records a plurality of log records, and each log record is used to record one transaction. Each log record of the replication log includes at least a timestamp and a transaction type of the transaction, and the transaction type includes a single-partition transaction or a multi-partition transaction. In addition, each log record also includes specific content of the transaction, for example, an operation executed by the transaction on a database or a database record modified by the transaction, so that data replication can be implemented by executing the log record. The single-partition transaction is a transaction running only in one partition, and the multi-partition transaction is a transaction running in all partitions. The timestamp of the transaction may be a transaction identifier (ID) added by a system for the transaction when the transaction is to be executed, and is used to uniquely identify the transaction.

Each partition of the primary cluster sends the maintained replication log to a corresponding partition of the secondary cluster. The partition A in FIG. 1 is used as an example. When obtaining a transaction, the partition A of the primary cluster adds a log record of the transaction to a replication log maintained by the partition A, and when a log buffer of the partition A is full, or comes to a specified period, or is in an idle state, sends the replication log to the corresponding partition µl of the secondary cluster.

Each partition of the secondary cluster maintains one log buffer. The log buffer is used to store a replication log of a corresponding partition of the primary cluster. For example, when receiving a replication log of the corresponding partition A of the primary cluster, the partition µl of the secondary cluster stores the replication log in the log buffer of the partition µl. In addition, each partition of the secondary cluster may alternatively obtain a replication log in the following manner: periodically obtaining, by each partition of the secondary cluster, a replication log from a corresponding partition of the primary cluster. No specific limitation is set in this sense in this embodiment of the present disclosure.

In addition, the distributed system further includes a coordination server. The coordination server may be included in the secondary cluster or the primary cluster, or may be an independent entity outside the secondary cluster and the primary cluster. No specific limitation is set in this sense in this embodiment of the present disclosure. Each partition of the secondary cluster is further configured to send a multi-partition transaction timestamp in the partition to the coordination server. The coordination server is configured to store timestamps of all multi-partition transactions in the secondary cluster. The coordination server may be an independent device outside the primary cluster and the secondary cluster of the distributed system, or may belong to the secondary cluster as an independent device of the secondary cluster, or may be deployed on all nodes or one node of the distributed system, preferably on all nodes or one node of the secondary cluster, and each node includes one or more partitions. In specific implementation, a function of the coordination server may be implemented by using a distributed service framework. The distributed service framework may be a framework such as Zookeeper. No specific limitation is set in this sense in this embodiment of the present disclosure.

Figure 2:
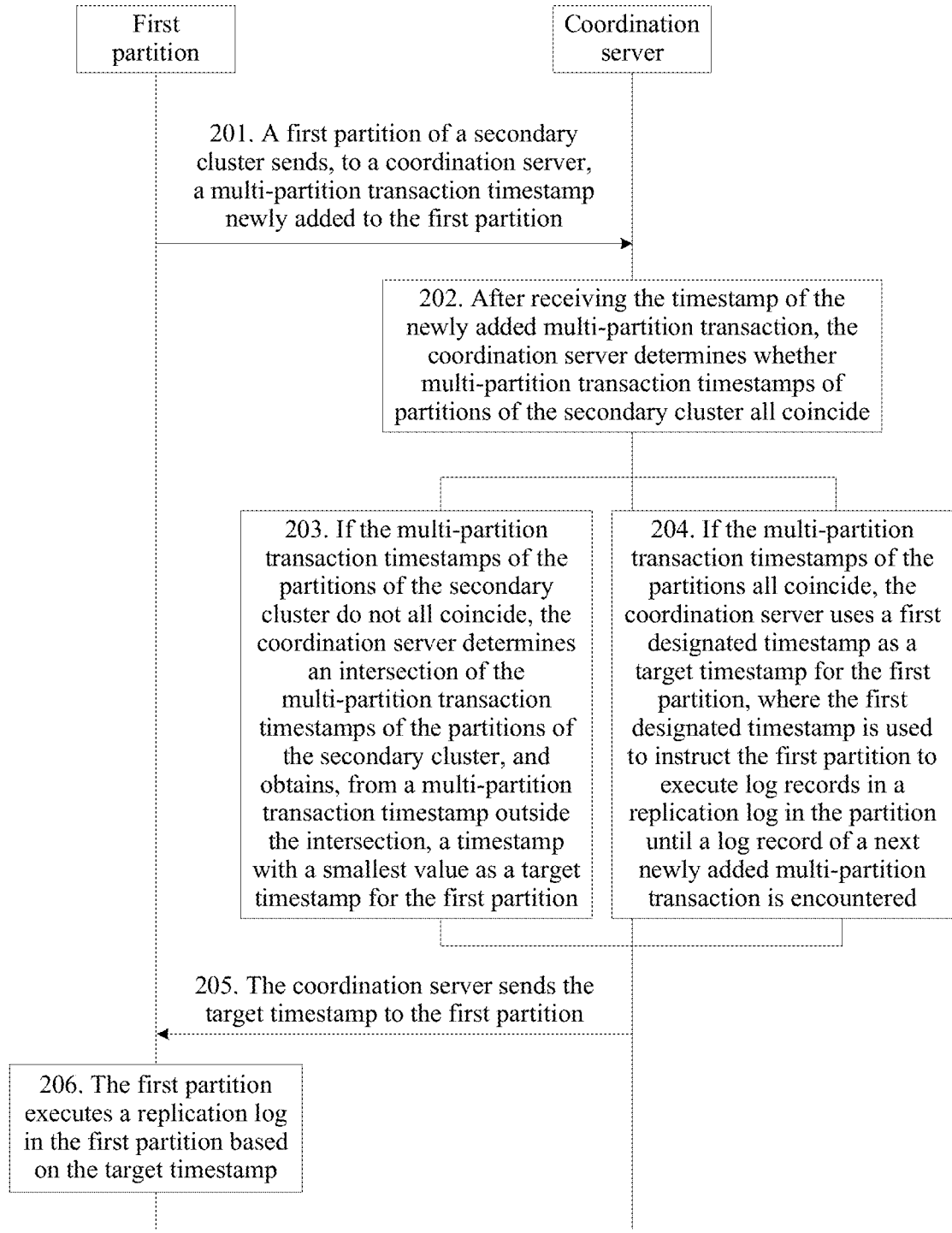
FIG. 2 is a flowchart of a database replication method for a distributed system according to an embodiment of the present disclosure.

FIG. 2 is a flowchart of a database replication method for a distributed system according to an embodiment of the present disclosure. Referring to FIG. 2, a process of the method provided in this embodiment of the present disclosure includes the following steps.

201. A first partition of a secondary cluster sends, to a coordination server, a multi-partition transaction timestamp newly added to the first partition.

The timestamp of the multi-partition transaction is used to indicate a log record of a multi-partition transaction in a replication log. The newly added multi-partition transaction is a multi-partition transaction among transactions recorded in a replication log that is sent by a corresponding partition of a primary cluster and received by the first partition since the first partition last sends a multi-partition transaction timestamp to the coordination server. There may be one or more newly added multi-partition transactions. No specific limitation is set in this sense in this embodiment of the present disclosure.

Specifically, when receiving the replication log of the corresponding partition of the primary cluster, the first partition stores the replication log in a log buffer of the first partition. A trigger condition for the first partition to send the timestamp of the newly added multi-partition transaction to the coordination server may be that the log buffer of the first partition is full, or that the first partition comes to a preset period, or that the first partition is in an idle state, or the like. No specific limitation is set in this sense in this embodiment of the present disclosure. The preset period may be any value, and is configured based on a system performance requirement. No specific limitation is set in this sense in this embodiment of the present disclosure. Correspondingly, when the trigger condition is that the log buffer is full, a process of sending the timestamp of the newly added multi-partition transaction to the coordination server by the first partition may be: detecting whether the log buffer of the current partition meets the trigger condition; if the trigger condition is met, obtaining the timestamp of the newly added multi-partition transaction from the stored replication log, that is, obtaining, from log records included in the replication log, a timestamp corresponding to a transaction that is of a multi-partition transaction type; and sending the timestamp of the newly added multi-partition transaction to the coordination server.

That the first partition is in an idle state means that the current partition has completed all executable transactions and is waiting to process a new transaction. For example, the first partition includes replication logs of a transaction 1, a transaction 2, a transaction 3, and a transaction 4, the transaction 1 and the transaction 2 are currently executable transactions, and the transaction 3 is a currently un-executable transaction and is a multi-partition transaction. When the first partition is about to execute the transaction 3, not all other partitions of the secondary cluster have included a replication log of the transaction 3, and therefore the first partition enters the idle state, waiting to execute the transaction 3.

The first partition may be any partition of the secondary cluster, and log buffers of all partitions of the secondary cluster may have a same storage capacity or different storage capacities. No specific limitation is set in this sense in this embodiment of the present disclosure.

202. After receiving the timestamp of the newly added multi-partition transaction, the coordination server determines whether multi-partition transaction timestamps of partitions of the secondary cluster all coincide, and if the multi-partition transaction timestamps of the partitions of the secondary cluster do not all coincide, performs the following step 203, or if the multi-partition transaction timestamps of the partitions of the secondary cluster all coincide, performs the following step 204.

In this embodiment of the present disclosure, the coordination server is configured to maintain a multi-partition transaction timestamp of each partition of the secondary cluster. Specifically, the coordination server may maintain a timestamp storage table in which a corresponding timestamp storage area is allocated to each partition of the secondary cluster. The timestamp storage area is used to store the multi-partition transaction timestamp of the partition. A possible form of the timestamp storage table is shown in Table 1.

TABLE 1

| Partition | Multi-partition transaction timestamp |
| --- | --- |
| Partition 1 | 4, 11, 15 |
| Partition 2 | 4, 11 |
| Partition 3 | 4, 11, 13 |
| ... | ... |

Specifically, the coordination server receives the timestamp of the multi-partition transaction newly added to the first partition of the secondary cluster, and stores the multi-partition transaction timestamp to a timestamp storage area for the first partition. Then, the coordination server determines whether the multi-partition transaction timestamps of the partitions of the secondary cluster all coincide, that is, whether there is a smallest timestamp among the multi-partition transaction timestamps of the partitions of the secondary cluster. The smallest timestamp is a multi-partition transaction timestamp that is not present in a timestamp storage area for at least one partition.

It should be noted that after receiving the timestamp of the newly added multi-partition transaction sent by the partition of the secondary cluster, the coordination server may learn, without determining, whether the multi-partition transaction timestamps of the partitions of the secondary cluster all coincide. No specific limitation is set on presence of a determining step in this embodiment of the present disclosure.

203. If the multi-partition transaction timestamps of the partitions of the secondary cluster do not all coincide, the coordination server determines an intersection of the multi-partition transaction timestamps of the partitions of the secondary cluster, and obtains, from a multi-partition transaction timestamp outside the intersection, a timestamp with a smallest value as a target timestamp for the first partition.

In this embodiment of the present disclosure, if the multi-partition transaction timestamps of the partitions of the secondary cluster do not all coincide, that is, if there is a smallest timestamp among the multi-partition transaction timestamps of the partitions of the secondary cluster, it indicates that multi-partition transactions included in the partitions of the secondary cluster are inconsistent. To ensure consistency of data processing between the partitions, the coordination server may obtain the target timestamp for the first partition from the multi-partition transaction timestamp outside the intersection. The target timestamp for the first partition is used to indicate information about a multi-partition transaction executable by the first partition, that is, a log record executable by the first partition, to avoid data inconsistency between the partitions caused by executing by the first partition a multi-partition transaction log record not included in another partition.

A process of obtaining the target timestamp for the first partition may be: determining multi-partition transaction timestamps that coincide in the partitions of the secondary cluster, that is, determining the intersection of the multi-partition transaction timestamps of the partitions of the secondary cluster; and obtaining, from the multi-partition transaction timestamp outside the intersection, the timestamp with the smallest value as the target timestamp for the first partition.

Figure 3:
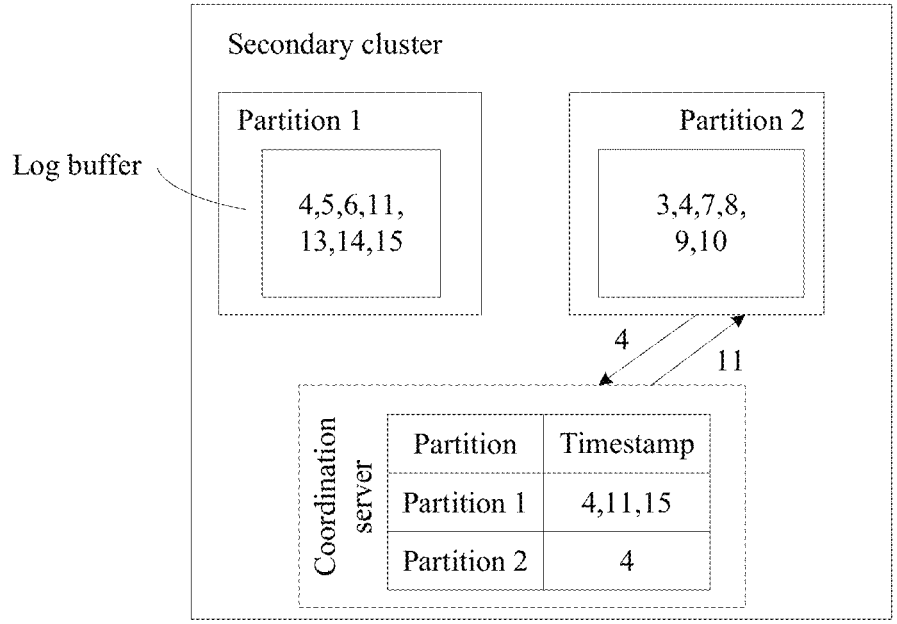
FIG. 3 is a schematic diagram of interaction between a partition included in a secondary cluster and a coordination server according to an embodiment of the present disclosure.

For example, the secondary cluster includes two partitions: a partition 1 and a partition 2. FIG. 3 is a schematic diagram of interaction between a partition included in the secondary cluster and the coordination server. In FIG. 3, timestamps corresponding to transactions included in a log buffer of the partition 1 are 4, 5, 6, 11, 13, 14, and 15, where 4, 11, and 15 are multi-partition transaction timestamps, and the rest are single-partition transaction timestamps. Timestamps corresponding to transactions included in a log buffer of the partition 2 are 3, 4, 7, 8, 9, and 10, where 4 is a multi-partition transaction timestamp, and the rest are single-partition transaction timestamps.

An example is used in which a timestamp of a newly added multi-partition transaction is sent to the coordination server when a partition meets the trigger condition. It is assumed that the log buffer of the partition 2 meets the trigger condition and that 4 is a timestamp of a multi-partition transaction newly added to the partition. In this case, the partition 2 sends the multi-partition transaction timestamp 4 to the coordination server, and the coordination server stores the multi-partition transaction timestamp to a timestamp storage area for the partition 2. As shown in FIG. 3, a timestamp storage area for the partition 1 includes the multi-partition transaction timestamps 4, 11, and 15, and the timestamp storage area for the partition 2 includes the multi-partition transaction timestamp 4. This indicates that the partition 2 of the secondary cluster does not include log records corresponding to the multi-partition transaction timestamps 11 and 15. The coordination server can clearly learn that the multi-partition transaction timestamps of the partition 1 and the partition 2 do not all coincide, an intersection of the multi-partition transaction timestamps of the two partitions is 4, and multi-partition transaction timestamps outside the intersection are 11 and 15. The coordination server selects a timestamp of a smaller value from 11 and 15 as a target timestamp, that is, selecting the multi-partition transaction timestamp 11 as a target timestamp for the partition 2.

In another embodiment, to make the obtained target timestamp for the first partition better match a current transaction execution status in the first partition, after determining the intersection of the multi-partition transaction timestamps of the partitions of the secondary cluster, the coordination server may further obtain, from a multi-partition transaction timestamp in the first partition that is outside the intersection, a timestamp with a smallest value as the target timestamp for the first partition.

204. If the multi-partition transaction timestamps of the partitions all coincide, the coordination server uses a first designated timestamp as a target timestamp for the first partition, where the first designated timestamp is used to instruct the first partition to execute log records in a replication log in the partition until a log record of a next newly added multi-partition transaction is encountered.

Specific content of the first designated timestamp may be preset. For example, a value of the first designated timestamp may be 0 or infinite, or the first designated timestamp may be a special string of characters, for example, "execute all". No specific limitation is set on the specific content of the first designated timestamp in this embodiment of the present disclosure.

Specifically, if the multi-partition transaction timestamps of the partitions of the secondary cluster all coincide, that is, if there is no smallest timestamp, it indicates that multi-partition transactions included in all the partitions of the secondary cluster are the same. In this case, the coordination server obtains the first designated timestamp, and uses the first designated timestamp as the target timestamp. The target timestamp is used to indicate that the first partition can execute log records of all transactions in the partition without causing data inconsistency between the first partition and another partition of the secondary cluster.

Figure 4:
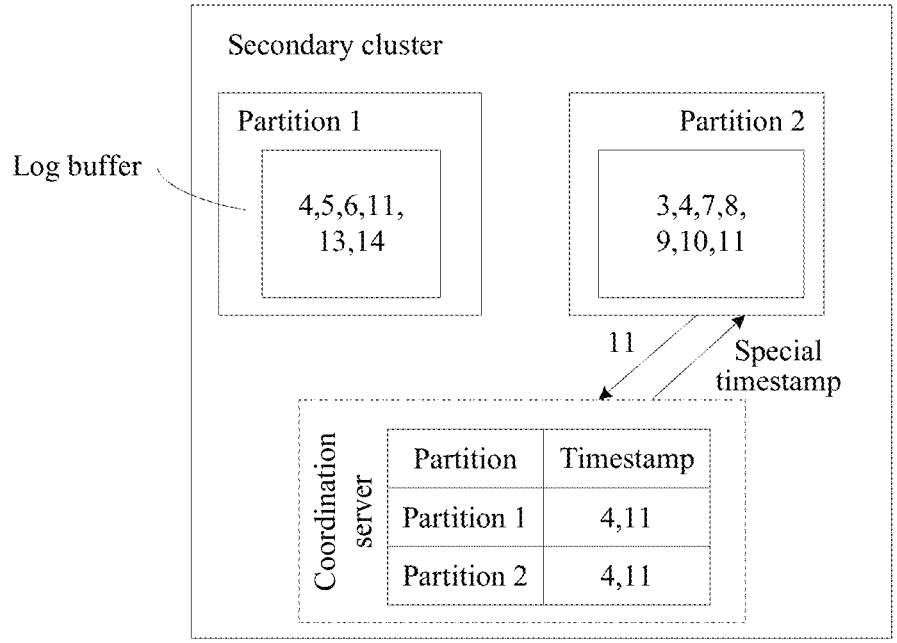
FIG. 4 is a schematic diagram of interaction between a partition included in a secondary cluster and a coordination server according to an embodiment of the present disclosure.

For example, the secondary cluster includes two partitions: a partition 1 and a partition 2. FIG. 4 is a schematic diagram of interaction between a partition included in the secondary cluster and the coordination server. In FIG. 4, timestamps corresponding to transactions included in a log buffer of the partition 1 are 4, 5, 6, 11, 13, and 14, where 4 and 11 are multi-partition transaction timestamps, and the rest are single-partition transaction timestamps. Timestamps corresponding to transactions included in a log buffer of the partition 2 are 3, 4, 7, 8, 9, 10, and 11, where 4 and 11 are multi-partition transaction timestamps, and the rest are single-partition transaction timestamps.

An example is used in which a trigger condition for a partition is that a log buffer is full. It is assumed that the log buffer of the partition 2 meets the trigger condition and that 1 is a timestamp of a multi-partition transaction newly added to the partition. In this case, the partition 2 sends the multi-partition transaction timestamp 11 to the coordination server. The coordination server stores the multi-partition transaction timestamp to a timestamp storage area for the partition 2. As shown in FIG. 4, a timestamp storage area for the partition 1 includes the multi-partition transaction timestamps 4 and 11, and the timestamp storage area for the partition 2 includes the multi-partition transaction timestamp 4 and 11. This indicates that the two partitions of the secondary cluster both include log records corresponding to the multi-partition transaction timestamps 4 and 11. The coordination server can clearly learn that the multi-partition transaction timestamps of the partition 1 and the partition 2 all coincide. Therefore, the coordination server determines the first designated timestamp as a target timestamp for the partition 2.

It should be noted that the foregoing step 202 to step 204 detail the following process, so that the coordination server can coordinate, based on the maintained multi-partition transaction timestamps of the partitions of the secondary cluster, execution of replication logs in the partitions by the partitions of the secondary cluster. The process may include: The coordination server determines the target timestamp for the first partition based on the received timestamp of the newly added multi-partition transaction and the multi-partition transaction timestamp, of each partition of the secondary cluster, stored on the coordination server. Specifically, after receiving the timestamp of the newly added multi-partition transaction sent by the first partition, the coordination server may update a locally stored multi-partition transaction timestamp of the first partition, and determine the target timestamp for the first partition based on after-update multi-partition transaction timestamps of the partitions.

It should be noted that in step 201, if the first partition has not obtained a timestamp of a newly added multi-partition transaction when meeting the trigger condition, that is, if the first partition receives no multi-partition transaction replication log sent by the corresponding partition of the primary cluster since the first partition last sends a timestamp of a newly added multi-partition transaction to the coordination server, the first partition may send a designated flag to the coordination server. The designated flag is used to indicate that there is no timestamp of a multi-partition transaction newly added to the first partition. After receiving the designated flag sent by the first partition, the coordination server obtains the target timestamp for the first partition in a same manner as in the foregoing step 202 to step 204, and then performs the following step 205 and step 206.

205. The coordination server sends the target timestamp to the first partition.

In this embodiment of the present disclosure, after receiving the target timestamp, the first partition may feed back an acknowledgment message to the coordination server. If the coordination server receives no acknowledgment message from the first partition within a specified time after sending the target timestamp to the first partition, the coordination server retransmits the target timestamp to the first partition to ensure that the first partition can receive the target timestamp.

206. The first partition executes a replication log in the first partition based on the target timestamp.

In this embodiment of the present disclosure, a process of executing the replication log in the first partition by the first partition may be: if the target timestamp for the first partition is the timestamp with the smallest value among the multi-partition transaction timestamp that is outside the intersection, executing a log record, in the replication log in the first partition, that is preceding a multi-partition transaction corresponding to the target timestamp; or if the target timestamp is the first designated timestamp, executing all log records in the replication log in the first partition until a log record of a next newly added multi-partition transaction is encountered.

Specifically, after receiving the target timestamp, the first partition may determine whether the target timestamp is the first designated timestamp. If the target timestamp is not the first designated timestamp, the first partition determines that the target timestamp is the timestamp with the smallest value among the multi-partition transaction timestamp that is outside the intersection, obtains, based on a value indicated by the target timestamp from the replication log stored in the first partition, a timestamp less than the target timestamp and a corresponding to-be-executed log record, and executes the to-be-executed log record. If the target timestamp is the first designated timestamp, the first partition executes log records in the replication log in the first partition until a log record of a next newly added multi-partition transaction is encountered. The next newly added multi-partition transaction is a $1^{st}$ multi-partition transaction, received by the first partition after the first partition receives the target timestamp, sent by the corresponding partition of the primary cluster.

It should be noted that after executing any log record in the replication log, the first partition deletes the executed log record from the replication log.

The example in the foregoing step 203 is used to explain a case in which the target timestamp is the timestamp with the smallest value among the timestamps outside the intersection of the multi-partition transaction timestamps of the partitions of the secondary cluster. Referring to FIG. 3, after selecting the multi-partition transaction timestamp 11 as the target timestamp for the partition 2, the coordination server sends the target timestamp to the partition 2. If the first designated timestamp is "0", after receiving the target timestamp, the partition 2 determines that the target timestamp is not the first designated timestamp "0", and may obtain, based on the value 11 indicated by the multi-partition transaction timestamp, a timestamp less than 11 from a stored replication log, including the timestamps 3, 4, 7, 8, 9, and 10. The partition 2 then executes log records corresponding to the timestamps 3, 4, 7, 8, 9, and 10.

The example in the foregoing step 204 is used to explain a case in which the target timestamp is the first designated timestamp. Referring to FIG. 4, the coordination server sends the first designated timestamp to the partition 2 as a target timestamp for the partition 2. It is assumed that the first designated timestamp is "0", After receiving the target timestamp, the partition 2 determines, based on the content "0" of the target timestamp, that the target timestamp is the first designated timestamp, and executes log records in the partition in a replication log execution manner indicated by the first designated timestamp until a log record of a subsequent newly added multi-partition transaction is encountered. The current partition 2 has received no log record of a newly added multi-partition transaction except for the existing multi-partition transactions 4 and 11, and therefore the partition 2 executes log records corresponding to the timestamps 3, 4, 7, 8, 9, 10, and 11.

According to the method provided in this embodiment of the present disclosure, each partition of the secondary cluster sends timestamps of all multi-partition transactions included in the partition to the coordination server, so that the coordination server can determine, based on statuses of the multi-partition transactions included in each partition, which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions.

Figure 5:
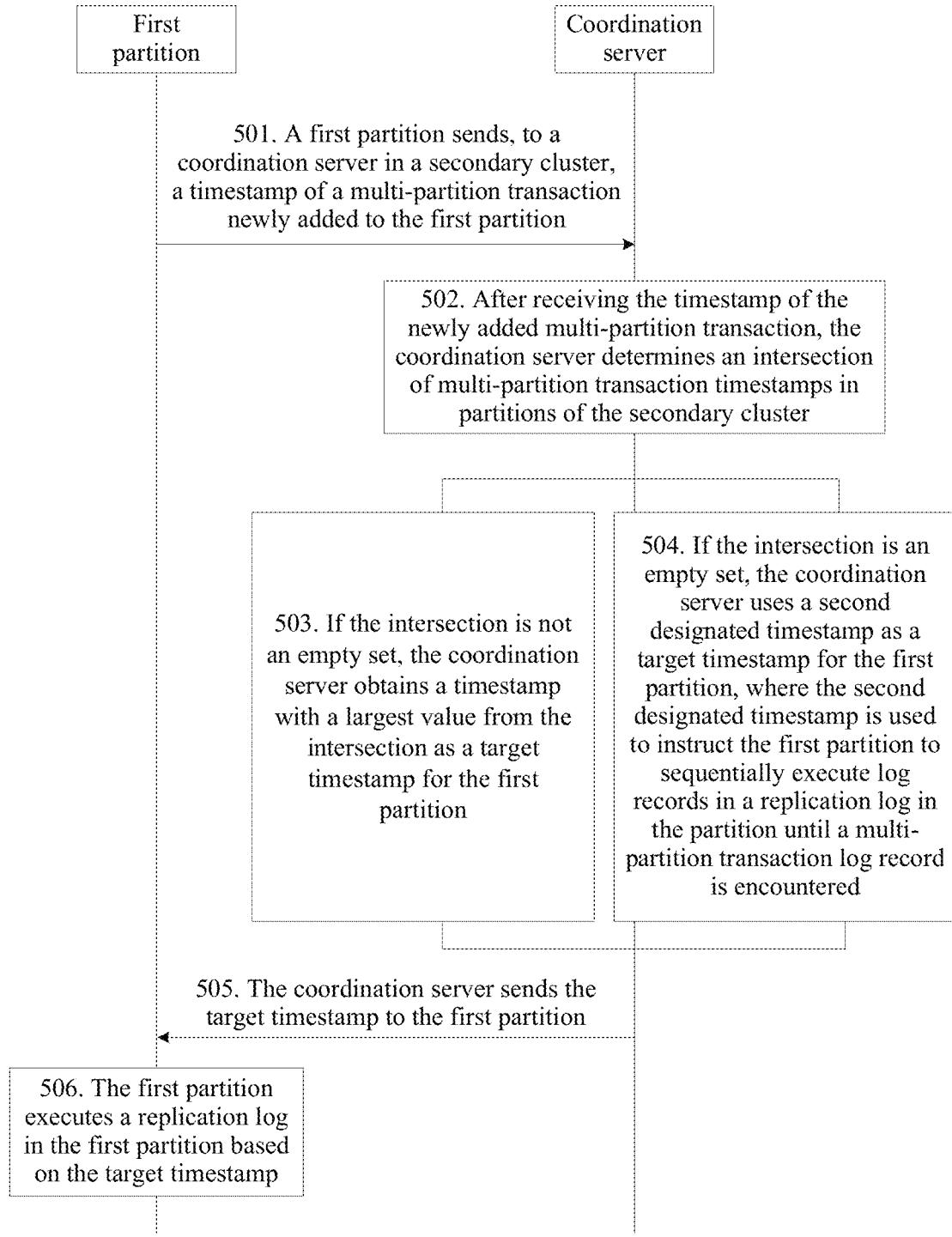
FIG. 5 is a flowchart of a database replication method for a distributed system according to an embodiment of the present disclosure.

FIG. 5 is a flowchart of a database replication method for a distributed system according to an embodiment of the present disclosure. Referring to FIG. 5, a process of the method provided in this embodiment of the present disclosure includes the following steps.

501. A first partition sends, to a coordination server in a secondary cluster, a timestamp of a multi-partition transaction newly added to the first partition.

Specifically, content of this step is the same as that of the foregoing step 201. Details are not repeated herein.

502. After receiving the timestamp of the newly added multi-partition transaction, the coordination server determines an intersection of multi-partition transaction timestamps in partitions of the secondary cluster and determines whether the intersection is an empty set, and if the intersection is an empty set, performs the following step 503, or if the intersection is not an empty set, performs the following step 504.

In this embodiment of the present disclosure, the coordination server is configured to maintain a multi-partition transaction timestamp of each partition of the secondary cluster. Specifically, the coordination server may maintain a timestamp storage table in which a corresponding timestamp storage area is allocated to each partition of the secondary cluster. The timestamp storage area is used to store the multi-partition transaction timestamp of the partition. A possible form of the timestamp storage table is shown in Table 2.

TABLE 2

| Partition | Multi-partition transaction timestamp |
|---|---|
| Partition 1 | 4, 11, 15 |
| Partition 2 | 4, 11 |
| Partition 3 | 4, 11, 13 |
| ... | ... |

Specifically, the coordination server receives the timestamp of the multi-partition transaction newly added to the first partition of the secondary cluster, and stores the multi-partition transaction timestamp to a timestamp storage area for the first partition. The coordination server then determines the intersection of the multi-partition transaction timestamps of the partitions, and determines whether the intersection is an empty set, that is, whether there is a largest timestamp in the multi-partition transaction timestamp of each partition. The largest timestamp is a timestamp with a largest value among a multi-partition transaction timestamp common to the timestamp storage areas for all the partitions.

It should be noted that after determining the intersection of the multi-partition transaction timestamps of the partitions, the coordination server may learn, without determining, whether the intersection is an empty set. No specific limitation is set on presence of a determining step in this embodiment of the present disclosure.

503. If the intersection is not an empty set, the coordination server obtains a timestamp with a largest value from the intersection as a target timestamp for the first partition.

In this embodiment of the present disclosure, if the intersection is not an empty set, that is, if a largest timestamp is present in the multi-partition transaction timestamp of each partition of the secondary cluster, it indicates that all the partitions of the secondary cluster include a same multi-partition transaction. To ensure data processing consistency between the partitions, the coordination server can determine the timestamp with the largest value in the intersection as the target timestamp. The target timestamp is used to indicate a log record executable by the first partition, to avoid data inconsistency between the partitions caused by executing by the first partition a multi-partition transaction log record that is not included in another partition.

Figure 6:
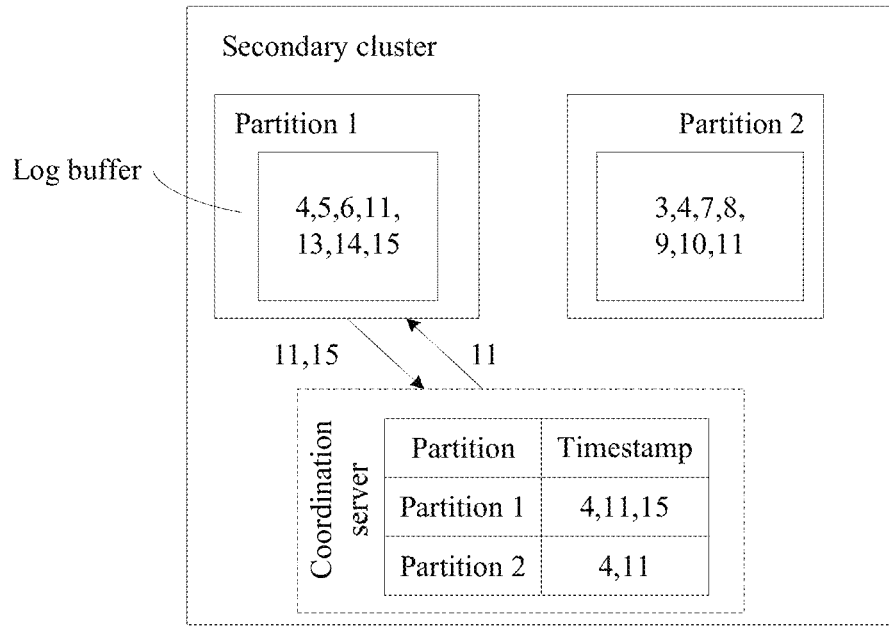
FIG. 6 is a schematic diagram of interaction between a partition included in a secondary cluster and a coordination server according to an embodiment of the present disclosure.

For example, the secondary cluster includes two partitions: a partition 1 and a partition 2. FIG. 6 is a schematic diagram of interaction between a partition included in the secondary cluster and the coordination server. In FIG. 6, timestamps corresponding to transactions included in a log buffer of the partition 1 are 4, 5, 6, 11, 13, 14, and 15, where 4, 11, and 15 are multi-partition transaction timestamps, and the rest are single-partition transaction timestamps. Timestamps corresponding to transactions included in a log buffer of the partition 2 are 3, 4, 7, 8, 9, 10, and 11, where 4 and 11 are multi-partition transaction timestamps, and the rest are single-partition transaction timestamps.

An example is used in which a trigger condition for a partition is that a log buffer is full. It is assumed that the log buffer of the partition 1 meets the trigger condition and that 11 and 15 are timestamps of multi-partition transactions newly added to the partition. In this case, the partition 1 sends the multi-partition transaction timestamps 11 and 15 to the coordination server. The coordination server stores the multi-partition transaction timestamps to a timestamp storage area for the partition 1. As shown in FIG. 6, the timestamp storage area for the partition 1 includes the multi-partition transaction timestamps 4, 11, and 15, and a timestamp storage area for the partition 2 includes the multi-partition transaction timestamps 4 and 11. This indicates that the two partitions of the secondary cluster both include log records corresponding to the multi-partition transaction timestamps 4 and 11. The coordination server can clearly learn that an intersection of the multi-partition transaction timestamps of the partition 1 and the partition 2 is 4 and 11. The coordination server selects a timestamp with a largest value from the intersection as a target timestamp, that is, obtaining a timestamp of a larger value from 4 and 11. Therefore, the coordination server selects the multi-partition transaction timestamp 11 as the target timestamp.

504. If the intersection is an empty set, the coordination server uses a second designated timestamp as a target timestamp for the first partition, where the second designated timestamp is used to instruct the first partition to sequentially execute log records in a replication log in the partition until a multi-partition transaction log record is encountered.

Specific content of the second designated timestamp may be preset. For example, a value of the second designated timestamp may be 0 or infinite, or the second designated timestamp may be a special string of characters, for example, "execute single". No specific limitation is set on the specific content of the second designated timestamp in this embodiment of the present disclosure.

Specifically, if the intersection is an empty set, that is, if there is no largest timestamp, it indicates that the partitions of the secondary cluster do not include a same multi-partition transaction. In this case, the coordination server obtains the second designated timestamp and uses the second designated timestamp as the target timestamp for the first partition. The target timestamp is used to indicate that the first partition can continue to execute single-partition transaction log records in the partition, to avoid data inconsistency between the partitions caused by execution of a multi-partition transaction.

Figure 7:
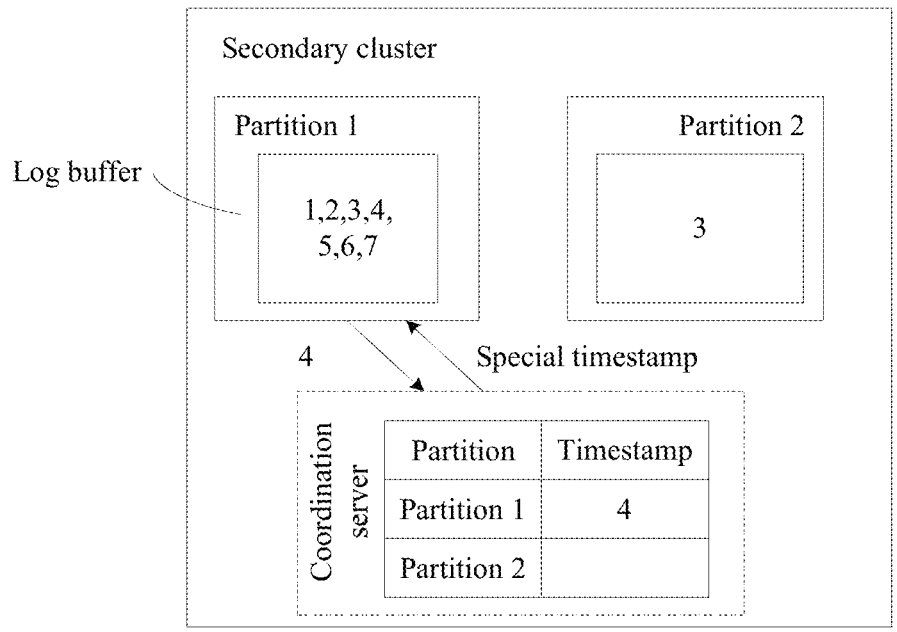
FIG. 7 is a schematic diagram of interaction between a partition included in a secondary cluster and a coordination server according to an embodiment of the present disclosure.

For example, the secondary cluster includes two partitions: a partition 1 and a partition 2. FIG. 7 is a schematic diagram of interaction between a partition included in the secondary cluster and the coordination server. In FIG. 7, timestamps corresponding to transactions included in a log buffer of the partition 1 are 1, 2, 4, 5, 6, and 7, where 4 is a multi-partition transaction timestamp, and the rest are single-partition transaction timestamps. A timestamp corresponding to a transaction included in a log buffer of the partition 2 is 3, where 3 is a single-partition transaction timestamp.

An example is used in which a trigger condition for a partition is that a log buffer is full. It is assumed that the log buffer of the partition 1 meets the trigger condition and that 4 is a timestamp of a multi-partition transaction newly added to the partition. In this case, the partition 1 sends the multi-partition transaction timestamp 4 to the coordination server. The coordination server stores the multi-partition transaction timestamp to a timestamp storage area for the partition 1. As shown in FIG. 7, the timestamp storage area for the partition 1 includes the multi-partition transaction timestamp 4, and a timestamp storage area for the partition 2 has no multi-partition transaction timestamp. This indicates that the two partitions of the secondary cluster do not include a same multi-partition transaction timestamp. Therefore, the coordination server determines the second designated timestamp as the target timestamp for the partition 1, so that the partition 1 continues to execute single-partition transaction log records in the partition.

The foregoing step 502 to step 504 detail the following process, so that the coordination server can coordinate, based on the maintained multi-partition transaction timestamps of the secondary cluster, execution of replication logs in the partitions by the partitions of the secondary cluster. The process may include: The coordination server determines the target timestamp for the first partition based on the received timestamp of the newly added multi-partition transaction and the multi-partition transaction timestamp, of each partition of the secondary cluster, stored on the coordination server.

It should be noted that in step 501, if the first partition has not obtained a timestamp of a newly added multi-partition transaction when meeting the trigger condition, that is, if the first partition receives no multi-partition transaction replication log sent by a corresponding partition of the primary cluster since the first partition last sends a timestamp of a newly added multi-partition transaction to the coordination server, the first partition may send a designated flag to the coordination server. The designated flag is used to indicate that there is no timestamp of a multi-partition transaction newly added to the first partition. After receiving the designated flag sent by the first partition, the coordination server obtains the target timestamp for the first partition in a same manner as in the foregoing step 502 to step 504, and then performs the following step 505 and step 506.

505. The coordination server sends the target timestamp to the first partition.

Specifically, content of this step is the same as that of the foregoing step 205. Details are not repeated herein.

506. The first partition executes a replication log in the first partition based on the target timestamp.

In this embodiment of the present disclosure, a process of executing the replication log in the first partition by the first partition may be: if the target timestamp for the first partition is the timestamp with the largest value in the intersection, executing a log record, in the first partition, that is preceding a multi-partition transaction corresponding to a $1^{st}$ multi-partition transaction timestamp following the target timestamp; or if the target timestamp for the first partition is the second designated timestamp, sequentially executing log records in the first partition until a log record of a next newly added multi-partition transaction is encountered.

Specifically, after receiving the target timestamp, the first partition may determine whether the target timestamp is the second designated timestamp. If the target timestamp is not the second designated timestamp, the first partition determines that the target timestamp is the timestamp with the largest value in the intersection, and executes log records in the replication log based on a value indicated by the target timestamp. If, among the log records stored in the first partition, there is a multi-partition transaction log record whose timestamp has a larger value than the target timestamp, the first partition obtains a $1^{st}$ multi-partition transaction following the multi-partition transaction corresponding to the target timestamp, and executes a log record preceding a timestamp of the $1^{st}$ multi-partition transaction. If, among the log records stored in the first partition, there is no multi-partition transaction log record whose timestamp has a larger value than the target timestamp, the first partition executes all log records in the first partition until a log record of a $1^{st}$ subsequent newly added multi-partition transaction is encountered. If the target timestamp is the second designated timestamp, the first partition continues to execute log records in the current partition, and if a log record about to be executed is corresponding to a single-partition transaction, executes the log record, or if a log record about to be executed is corresponding to a multi-partition transaction, stops the execution.

It should be noted that after executing any log record in the replication log, the first partition deletes the executed log record from the replication log.

The example in the foregoing step 503 is used to explain a case in which the target timestamp is the timestamp with the largest value in the intersection. Referring to FIG. 6, after selecting the multi-partition transaction timestamp 11 as the target timestamp for the partition 1, the coordination server sends the target timestamp to the partition 1. If the second designated timestamp is "0", after receiving the target timestamp, the partition 1 determines that the target timestamp is not the second designated timestamp "0". Therefore, because the multi-partition transaction timestamp indicated by the target timestamp is 11, and a $1^{st}$ multi-partition transaction timestamp following the timestamp 11 in the partition 1 is 15, the partition 1 executes log records corresponding to timestamps preceding the timestamp 15. In other words, the partition 2 executes log records corresponding to the timestamps 4, 5, 6, 11, 13, and 14.

The example in the foregoing step 504 is used to explain a case in which the target timestamp is the second designated timestamp. Referring to FIG. 7, the coordination server sends the second designated timestamp to the partition 1 as a target timestamp. It is assumed that the second designated timestamp is "0". After receiving the target timestamp, the partition 1 determines, based on the content "0" of the target timestamp, that the target timestamp is the second designated timestamp, and continues to execute log records in the partition in a replication log execution manner indicated by the second designated timestamp. As shown in FIG. 7, a log record about to be executed in the partition 1 is a log record whose timestamp is 1. The timestamp 1 is corresponding to a single-partition transaction, and therefore after the log record is executed, a log record of a single-partition transaction corresponding to the timestamp 2 is executed. When the log record corresponding to the timestamp 4 is encountered, because the timestamp 4 is corresponding to a multi-partition transaction, the execution is stopped.

According to the method provided in this embodiment of the present disclosure, each partition of the secondary cluster sends timestamps of all multi-partition transactions included in the partition to the coordination server, so that the coordination server can determine, based on statuses of the multi-partition transactions included in each partition, which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions.

An embodiment of the present disclosure provides a distributed system, and the system includes a primary cluster and a secondary cluster. Both the primary cluster and the secondary cluster include a plurality of database partitions, and the plurality of partitions of the primary cluster are in one-to-one correspondence with the plurality of partitions of the secondary cluster. Each partition of the primary cluster sends a replication log of the partition to a corresponding partition of the secondary cluster, and the replication log records data operation transactions. The secondary cluster also includes a coordination server.

A first partition of the secondary cluster is configured to send, to the coordination server, a timestamp of a multi-partition transaction newly added to the first partition. The newly added multi-partition transaction is a multi-partition transaction among transactions recorded in a replication log that is sent by a corresponding partition of the primary cluster and received by the first partition since the first partition last sends a multi-partition transaction timestamp to the coordination server.

The coordination server is configured to determine a target timestamp for the first partition based on the received timestamp of the newly added multi-partition transaction and a multi-partition transaction timestamp, of each partition of the secondary cluster, stored on the coordination server. The target timestamp is used to indicate information about a multi-partition transaction executable by the first partition. The coordination server is further configured to send the target timestamp to the first partition.

The first partition is further configured to execute a replication log in the first partition based on the target timestamp.

According to the system provided in this embodiment of the present disclosure, each partition of the secondary cluster sends timestamps of all multi-partition transactions included in the partition to the coordination server, so that the coordination server can determine, based on statuses of the multi-partition transactions included in each partition, which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions.

Figure 8:
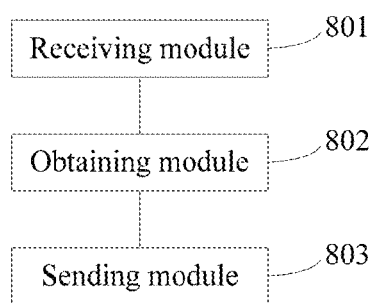
FIG. 8 is a block diagram of a database replication apparatus for a distributed system according to an embodiment of the present disclosure.

FIG. 8 is a block diagram of a database replication apparatus for a distributed system according to an embodiment of the present disclosure, including a receiving module 801, an obtaining module 802, and a sending module 803.

The receiving module 801 is connected to the obtaining module 802, and is configured to receive a timestamp of a multi-partition transaction newly added to a first partition of a secondary cluster. The newly added multi-partition transaction is a multi-partition transaction among transactions recorded in a replication log that is sent by a corresponding partition of a primary cluster and received by the first partition since the first partition last sends a multi-partition transaction timestamp. The obtaining module 802 is connected to the sending module 803, and is configured to determine a target timestamp for the first partition based on the received timestamp of the newly added multi-partition transaction and a stored multi-partition transaction timestamp of each partition of the secondary cluster. The target timestamp is used to indicate information about a multi-partition transaction executable by the first partition. The sending module 803 is configured to send the target timestamp to the first partition, so that the first partition executes a replication log in the first partition based on the target timestamp.

Optionally, the obtaining module 802 is configured to: determine whether the multi-partition transaction timestamps of the partitions of the secondary cluster all coincide; and if the multi-partition transaction timestamps of the partitions of the secondary cluster do not all coincide, determine an intersection of the multi-partition transaction timestamps of the partitions of the secondary cluster, and obtain, from a multi-partition transaction timestamp, that is outside the intersection, of the partitions of the secondary cluster, a timestamp with a smallest value as the target timestamp for the first partition, where the timestamp with the smallest value is used to instruct the first partition to execute a log record, in the replication log in the first partition, that is preceding a multi-partition transaction corresponding to the target timestamp; or if the multi-partition transaction timestamps of the partitions all coincide, use a first designated timestamp as the target timestamp for the first partition, where the first designated timestamp is used to instruct the first partition to execute log records in the replication log in the partition until a log record of a next newly added multi-partition transaction is encountered. Based on the maintained timestamp of a multi-partition transaction included in each partition, a coordination server can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

Optionally, the obtaining module 802 is configured to: determine an intersection of the multi-partition transaction timestamps of the partitions of the secondary cluster and determine whether the intersection is an empty set; and if the intersection is not an empty set, obtain a timestamp with a largest value from the intersection as the target timestamp for the first partition, where the timestamp with the largest value is used to instruct the first partition to execute a log record, in the first partition, that is preceding a multi-partition transaction corresponding to a $1^{st}$ multi-partition transaction timestamp following the target timestamp; or if the intersection is an empty set, use a second designated timestamp as the target timestamp for the first partition, where the second designated timestamp is used to instruct the first partition to sequentially execute log records in the replication log in the partition until a multi-partition transaction log record is encountered. Based on the maintained timestamp of a multi-partition transaction included in each partition, the coordination server can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency and increasing replication efficiency. This makes a database replication method of excellent performance.

According to the apparatus provided in this embodiment of the present disclosure, each partition of the secondary cluster sends timestamps of all multi-partition transactions included in the partition to the coordination server, so that the coordination server can determine, based on statuses of the multi-partition transactions included in each partition, which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

Figure 9:
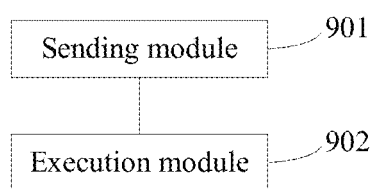
FIG. 9 is a block diagram of a database replication apparatus for a distributed system according to an embodiment of the present disclosure.

FIG. 9 is a block diagram of a database replication apparatus for a distributed system according to an embodiment of the present disclosure, including a sending module 901 and an execution module 902.

The sending module 901 is connected to the execution module 902, and is configured to send, to a coordination server in a secondary cluster, a timestamp of a multi-partition transaction newly added to the first partition. The coordination server determines a target timestamp for the first partition based on the received timestamp of the newly added multi-partition transaction and a stored multi-partition transaction timestamp of each partition of the secondary cluster, and sends the target timestamp to the first partition. The target timestamp is used to indicate information about a multi-partition transaction executable by the first partition. The execution module 902 is configured to execute a replication log in the first partition based on the target timestamp for the first partition.

Optionally, the execution module 902 is configured to: if the target timestamp for the first partition is a timestamp with a smallest value among a multi-partition transaction timestamp that is outside an intersection of the multi-partition transaction timestamps of the partitions of the secondary cluster, execute a log record, in the replication log in the first partition, that is preceding a multi-partition transaction corresponding to the target timestamp; or if the target timestamp is a first designated timestamp, execute log records in the replication log in the first partition until a log record of a next newly added multi-partition transaction is encountered, where the first designated timestamp indicates that the multi-partition transaction timestamps of the partitions of the secondary cluster all coincide. Log record execution based on the target timestamp for the first partition can ensure that an executed multi-partition transaction is present in all the partitions. In this way, the first partition does not have to enter a waiting state whenever a multi-partition transaction is encountered, thereby avoiding data inconsistency between the first partition and another partition of the secondary cluster.

Optionally, the execution module 902 is configured to: if the target timestamp for the first partition is a timestamp with a largest value in an intersection of the multi-partition transaction timestamps of the partitions of the secondary cluster, execute a log record, in the first partition, that is preceding a multi-partition transaction corresponding to a $1^{st}$ multi-partition transaction timestamp following the target timestamp; or if the target timestamp for the first partition is a second designated timestamp, sequentially execute log records in the first partition until a multi-partition transaction log record is encountered, where the second designated timestamp indicates that an intersection of the multi-partition transaction timestamps of the partitions of the secondary cluster is an empty set. Log record execution based on the target timestamp for the first partition can ensure that an executed multi-partition transaction is present in all the partitions. In this way, the first partition does not have to enter a waiting state whenever a multi-partition transaction is encountered, thereby avoiding data inconsistency between the first partition and another partition of the secondary cluster.

According to the apparatus provided in this embodiment of the present disclosure, each partition of the secondary cluster sends timestamps of all multi-partition transactions included in the partition to the coordination server, so that the coordination server can determine, based on statuses of the multi-partition transactions included in each partition, which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

It should be noted that when the data transmission apparatus provided in the foregoing embodiment performs data transmission, the division into the foregoing functional modules is merely used as an example for description. In actual application, the foregoing functions may be allocated to different functional modules for implementation depending on a requirement. To be specific, an internal structure of the apparatus is divided into different functional modules to implement all or some of the foregoing functions. In addition, the data transmission apparatus and the data transmission method that are provided in the foregoing embodiments are based on a same idea. For a specific implementation process of the apparatus, refer to the method embodiments. Details are not repeated herein.

Figure 10:
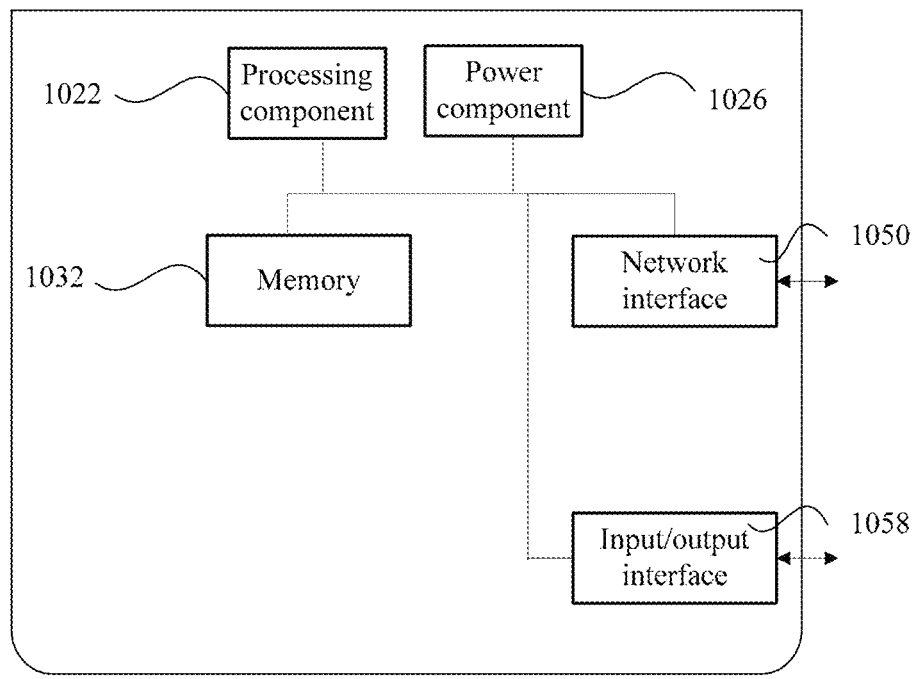
FIG. 10 is a schematic structural diagram of a coordination server according to an embodiment of the present disclosure.

FIG. 10 is a schematic structural diagram of a coordination server according to an embodiment of the present disclosure. The coordination server is configured to implement the method executed by the coordination server in the foregoing method. Referring to FIG. 10, the coordination server includes a processing component 1022 that further includes one or more processors, and a memory resource represented by a memory 1032 configured to store an instruction executable by the processing component 1022, for example, an application program. The application program stored in the memory 1032 may include one or more modules that are each corresponding to a set of instructions. Additionally, the processing component 1022 is configured to execute the instruction, so as to perform the following steps:

receiving a timestamp of a multi-partition transaction newly added to a first partition of a secondary cluster, where the newly added multi-partition transaction is a multi-partition transaction among transactions recorded in a replication log that is sent by a corresponding partition of a primary cluster and received by the first partition since the first partition last sends a multi-partition transaction timestamp; determining a target timestamp for the first partition based on the received timestamp of the newly added multi-partition transaction and a stored multi-partition transaction timestamp of each partition of the secondary cluster, where the target timestamp is used to indicate information about a multi-partition transaction executable by the first partition; and sending the target timestamp to the first partition, so that the first partition executes a replication log in the first partition based on the target timestamp.

Optionally, the determining a target timestamp for the first partition based on the received timestamp of the newly added multi-partition transaction and a stored multi-partition transaction timestamp of each partition of the secondary cluster includes:

determining whether the multi-partition transaction timestamps of the partitions of the secondary cluster all coincide; and if the multi-partition transaction timestamps of the partitions of the secondary cluster do not all coincide, determining an intersection of the multi-partition transaction timestamps of the partitions of the secondary cluster, and obtaining, from a multi-partition transaction timestamp, that is outside the intersection, of the partitions of the secondary cluster, a timestamp with a smallest value as the target timestamp for the first partition, where the timestamp with the smallest value is used to instruct the first partition to execute a log record, in the replication log in the first partition, that is preceding a multi-partition transaction corresponding to the target timestamp; or if the multi-partition transaction timestamps of the partitions all coincide, using a first designated timestamp as the target timestamp for the first partition, where the first designated timestamp is used to instruct the first partition to execute log records in the replication log in the partition until a log record of a next newly added multi-partition transaction is encountered. Based on the maintained timestamp of a multi-partition transaction included in each partition, the coordination server can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

Optionally, the determining a target timestamp for the first partition based on the received timestamp of the newly added multi-partition transaction and a stored multi-partition transaction timestamp of each partition of the secondary cluster includes: determining an intersection of the multi-partition transaction timestamps of the partitions of the secondary cluster and determining whether the intersection is an empty set; and if the intersection is not an empty set, obtaining a timestamp with a largest value from the intersection as the target timestamp for the first partition, where the timestamp with the largest value is used to instruct the first partition to execute a log record, in the first partition, that is preceding a multi-partition transaction corresponding to a $1^{st}$ multi-partition transaction timestamp following the target timestamp; or if the intersection is an empty set, using a second designated timestamp as the target timestamp for the first partition, where the second designated timestamp is used to instruct the first partition to sequentially execute log records in the replication log in the partition until a multi-partition transaction log record is encountered. The target timestamp is sent to the first partition, so that the first partition can execute log records in the partition based on the target timestamp. This ensures data consistency between the first partition and another partition of the secondary cluster.

The coordination server may further include a power component 1026 configured to perform power management for the coordination server, a wired or wireless network interface 1050 configured to connect the coordination server to a network, and an input/output (I/O) interface 1058. The coordination server can operate an operating system stored in the memory 1032, for example, Windows Server™, Mac OS X™, Unix™, Linux™, or FreeBSD™.

Based on the maintained timestamp of a multi-partition transaction included in each partition, the coordination server provided in this embodiment of the present disclosure can determine which multi-partition transactions are already present in all the partitions and which multi-partition transactions are not present in all the partitions, and inform, by using the target timestamp, a corresponding partition which log records can be executed. In this way, the corresponding partition can execute a multi-partition transaction that is present in all the partitions but has not been executed, and does not have to enter a waiting state whenever a multi-partition transaction is encountered, thereby avoiding data inconsistency between the partitions of the secondary cluster.

Figure 11:
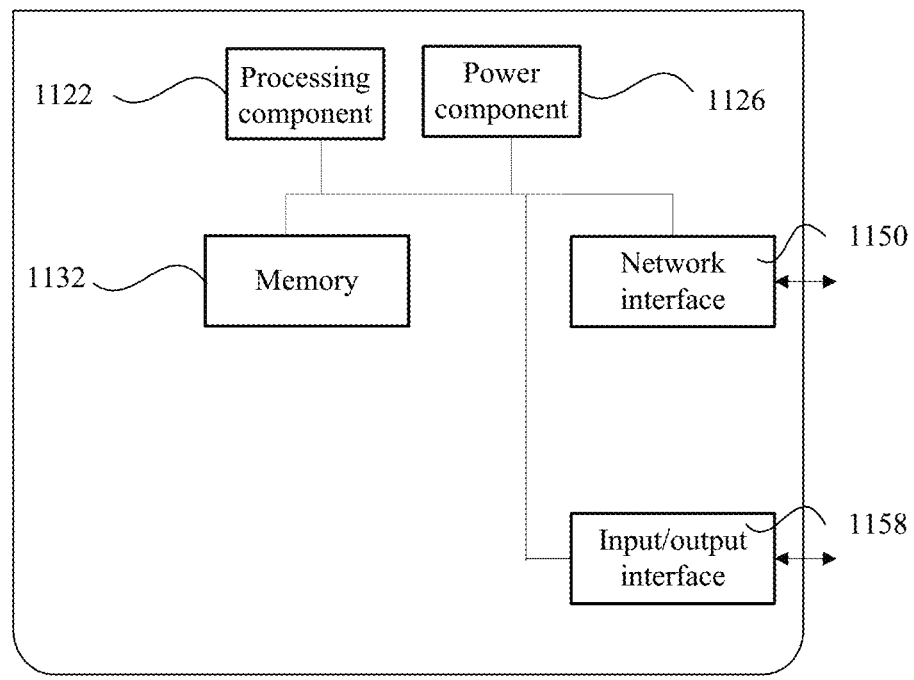
FIG. 11 is a schematic structural diagram of a database replication apparatus for a distributed system according to an embodiment of the present disclosure.

FIG. 11 is a schematic structural diagram of a database replication apparatus for a distributed system according to an embodiment of the present disclosure. Referring to FIG. 11, the apparatus includes a processing component 1122 that further includes one or more processors, and a memory resource represented by a memory 1132 configured to store an instruction executable by the processing component 1122, for example, an application program. The application program stored in the memory 1132 may include one or more modules that are each corresponding to a set of instructions. Additionally, the processing component 1122 is configured to:

send, to a coordination server, a timestamp of a multi-partition transaction newly added to a first partition, so that the coordination server determines a target timestamp for the first partition based on the received timestamp of the newly added multi-partition transaction and a stored multi-partition transaction timestamp of each partition of a secondary cluster, and sends the target timestamp to the first partition, where the target timestamp is used to indicate information about a multi-partition transaction executable by the first partition; and execute a replication log in the first partition based on the target timestamp for the first partition.

Optionally, the processor component is further configured to: if the target timestamp for the first partition is a timestamp with a smallest value among a multi-partition transaction timestamp that is outside an intersection of the multi-partition transaction timestamps of the partitions of the secondary cluster, execute a log record, in the replication log in the first partition, that is preceding a multi-partition transaction corresponding to the target timestamp; or if the target timestamp is a first designated timestamp, execute log records in the replication log in the first partition until a log record of a next newly added multi-partition transaction is encountered, where the first designated timestamp indicates that the multi-partition transaction timestamps of the partitions of the secondary cluster all coincide. That the first partition executes log records based on the target timestamp ensures that an executed multi-partition transaction is present in all the partitions, and the first partition does not have to enter a waiting state whenever a multi-partition transaction is encountered, thereby avoiding data inconsistency between the first partition and another partition of the secondary cluster.

Optionally, the processor is further configured to: if the target timestamp for the first partition is a timestamp with a largest value in an intersection of the multi-partition transaction timestamps of the partitions of the secondary cluster, execute a log record, in the first partition, that is preceding a multi-partition transaction corresponding to a $1^{st}$ multi-partition transaction timestamp following the target timestamp; or if the target timestamp for the first partition is a second designated timestamp, sequentially execute log records in the first partition until a multi-partition transaction log record is encountered, where the second designated timestamp indicates that an intersection of the multi-partition transaction timestamps of the partitions of the secondary cluster is an empty set. That the first partition executes log records based on the target timestamp ensures that an executed multi-partition transaction is present in all the partitions, and the first partition does not have to enter a waiting state whenever a multi-partition transaction is encountered, thereby avoiding data inconsistency between the first partition and another partition of the secondary cluster.

According to the apparatus provided in this embodiment of the present disclosure, log record execution based on the target timestamp for the first partition ensures that an executed multi-partition transaction is present in all the partitions, and the first partition does not have to enter a waiting state whenever a multi-partition transaction is encountered, thereby avoiding data inconsistency between the first partition and another partition of the secondary cluster.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing description is merely example embodiments of the present disclosure, but is not intended to limit the present disclosure. Any modification, equivalent replacement, and improvement made without departing from the spirit and principle of the present disclosure shall fall within the protection scope of the present disclosure.

What is claimed is:

1. A database replication method for a distributed system, the method comprising:
    receiving, by a coordination server, a timestamp of a multi-partition transaction newly added to a first partition of a secondary cluster, wherein the newly added multi-partition transaction is a multi-partition transaction among transactions recorded in a replication log that is sent by a corresponding partition of a primary cluster and received by the first partition since the first partition last sends a multi-partition transaction timestamp;
    determining, by the coordination server, a target timestamp for the first partition based on the received timestamp of the newly added multi-partition transaction and a stored multi-partition transaction timestamp of each partition of the secondary cluster, wherein the target timestamp indicates information about a multi-partition transaction executable by the first partition; and
    sending, by the coordination server, the target timestamp to the first partition.

2. The method according to claim 1, wherein determining, by a coordination server, a target timestamp for the first partition based on the received timestamp of the newly added multi-partition transaction and a stored multi-partition transaction timestamp of each partition of the secondary cluster comprises:
    determining the multi-partition transaction timestamps of the partitions of the secondary cluster do not all coincide by the coordination server;
    determining an intersection of the multi-partition transaction timestamps of the partitions of the secondary cluster by the coordination server; and
    obtaining, by the coordination server, from a multi-partition transaction timestamp, that is outside the intersection, of the partitions of the secondary cluster, a timestamp with a smallest value as the target timestamp for the first partition, the timestamp with the smallest value for instructing the first partition to execute a log record, in the replication log in the first partition, that is preceding a multi-partition transaction corresponding to the target timestamp.

3. The method according to claim 1, wherein determining, by a coordination server, a target timestamp for the first partition based on the received timestamp of the newly added multi-partition transaction and a stored multi-partition transaction timestamp of each partition of the secondary cluster, by a coordination server, comprises:
    determining the multi-partition transaction timestamps of the partitions all coincide by the coordination server; and
    using a first designated timestamp as the target timestamp for the first partition by the coordination server, the first designated timestamp for instructing the first partition to execute log records in the replication log in the partition until a log record of a next newly added multi-partition transaction is encountered.

4. The method according to claim 1, wherein determining, by a coordination server, a target timestamp for the first partition based on the received timestamp of the newly added multi-partition transaction and a stored multi-partition transaction timestamp of each partition of the secondary cluster comprises:
    determining an intersection of the multi-partition transaction timestamps of the partitions of the secondary cluster by the coordination server;
    determining the intersection is not an empty set by the coordination server; and
    obtaining a timestamp with a largest value from the intersection as the target timestamp for the first partition by the coordination server, the timestamp with the largest value for instructing the first partition to execute a log record, in the first partition, that is preceding a multi-partition transaction corresponding to a $1^{st}$ multi-partition transaction timestamp following the target timestamp.

5. The method according to claim 1, wherein determining, by the coordination server, a target timestamp for the first partition based on the received timestamp of the newly added multi-partition transaction and a stored multi-partition transaction timestamp of each partition of the secondary cluster, by the coordination server, comprises:
    determining an intersection of the multi-partition transaction timestamps of the partitions of the secondary cluster by the coordination server;
    determining the intersection is an empty set by the coordination server; and
    using a second designated timestamp as the target timestamp for the first partition by the coordination server, the second designated timestamp for instructing the first partition to sequentially execute log records in the replication log in the partition until a multi-partition transaction log record is encountered.

6. A database replication method for a distributed system, the method comprising:
    sending, by a first partition, to a coordination server, a timestamp of a multi-partition transaction newly added to the first partition;
    receiving, by a first partition, a target timestamp from the coordination server, wherein the target timestamp is used to indicate information about a multi-partition transaction executable by the first partition, and wherein the target timestamp is based on a received timestamp of the newly added multi-partition transaction and a stored multi-partition transaction timestamp of each partition of a secondary cluster; and
    executing, by the first partition, a replication log in the first partition based on the target timestamp for the first partition.

7. The method according to claim 6, wherein executing, by the first partition, a replication log in the first partition based on the target timestamp for the first partition comprises:
    determining, by the first partition, the target timestamp for the first partition is a timestamp with a smallest value among a multi-partition transaction timestamp that is outside an intersection of the multi-partition transaction timestamps of the partitions of the secondary cluster; and executing a log record, by a first partition, in the replication log in the first partition, that is preceding a multi-partition transaction corresponding to the target timestamp.

8. The method according to claim 6, wherein executing, by the first partition, a replication log in the first partition based on the target timestamp for the first partition comprises:

determining, by the first partition, the target timestamp is a first designated timestamp; and executing, by the first partition, log records in the replication log in the first partition until a log record of a next newly added multi-partition transaction is encountered, wherein the first designated timestamp indicates that the multi-partition transaction timestamps of the partitions of the secondary cluster all coincide.

9. The method according to claim 6, wherein executing, by the first partition, a replication log in the first partition based on the target timestamp for the first partition comprises:

determining, by the first partition, the target timestamp for the first partition is a timestamp with a largest value in an intersection of the multi-partition transaction timestamps of the partitions of the secondary cluster; and executing, by the first partition, a log record, in the first partition, that is preceding a multi-partition transaction corresponding to a $1^{st}$ multi-partition transaction timestamp following the target timestamp.

10. The method according to claim 6, wherein executing, by the first partition, a replication log in the first partition based on the target timestamp for the first partition comprises:

determining, by the first partition, the target timestamp for the first partition is a second designated timestamp; and sequentially executing, by the first partition, log records in the first partition until a multi-partition transaction log record is encountered, wherein the second designated timestamp indicates that an intersection of the multi-partition transaction timestamps of the partitions of the secondary cluster is an empty set.

11. A coordination server, comprising:

a memory and a processor, wherein the memory has a plurality of computer-executable instructions stored thereon that, when executed by the processor, cause the coordination server to:

receive a timestamp of a multi-partition transaction newly added to a first partition of a secondary cluster, wherein the newly added multi-partition transaction is a multi-partition transaction among transactions recorded in a replication log that is sent by a corresponding partition of a primary cluster and received by the first partition since the first partition last sends a multi-partition transaction timestamp;

determine a target timestamp for the first partition based on the received timestamp of the newly added multi-partition transaction and a stored multi-partition transaction timestamp of each partition of the secondary cluster, wherein the target timestamp indicates information about a multi-partition transaction executable by the first partition; and send the target timestamp to the first partition.

12. The coordination server according to claim 11, wherein the computer-executable instructions when executed by the processor, further cause the coordination server to:

determine the multi-partition transaction timestamps of the partitions of the secondary cluster do not all coincide;

determine an intersection of the multi-partition transaction timestamps of the partitions of the secondary cluster; and obtain from a multi-partition transaction timestamp, that is outside the intersection, of the partitions of the secondary cluster, a timestamp with a smallest value as the target timestamp for the first partition, the timestamp with the smallest value for instructing the first partition to execute a log record, in the replication log in the first partition, that is preceding a multi-partition transaction corresponding to the target timestamp.

13. The coordination server according to claim 11, wherein the computer-executable instructions when executed by the processor further cause the coordination server to:

determine the multi-partition transaction timestamps of the partitions all coincide; and using a first designated timestamp as the target timestamp for the first partition by the coordination server, the first designated timestamp for instructing the first partition to execute log records in the replication log in the partition until a log record of a next newly added multi-partition transaction is encountered.

14. The coordination server according to claim 11, wherein the computer-executable instructions when executed by the processor further cause the coordination server to:

determine an intersection of the multi-partition transaction timestamps of the partitions of the secondary cluster;

determine the intersection is not an empty set; and obtain a timestamp with a largest value from the intersection as the target timestamp for the first partition, the timestamp with the largest value for instructing the first partition to execute a log record, in the first partition, that is preceding a multi-partition transaction corresponding to a $1^{st}$ multi-partition transaction timestamp following the target timestamp.

15. The coordination server according to claim 11, wherein the computer-executable instructions when executed by the processor further cause the coordination server to:

determine an intersection of the multi-partition transaction timestamps of the partitions of the secondary cluster;

determine the intersection is an empty set; and use a second designated timestamp as the target timestamp for the first partition, the second designated timestamp for instructing the first partition to sequentially execute log records in the replication log in the partition until a multi-partition transaction log record is encountered.

* * * * *